US008319857B2

(12) United States Patent
Qu et al.

(10) Patent No.: US 8,319,857 B2
(45) Date of Patent: Nov. 27, 2012

(54) APPARATUS AND METHOD FOR CORRECTING DIGITAL COLOR PHOTOGRAPHS

(75) Inventors: Di Qu, Ada, MI (US); Richard B. Bylsma, Ada, MI (US); James R. Mayne, Lowell, MI (US)

(73) Assignee: Access Business Group International LLC, Ada, MI (US)

( * ) Notice: Subject to any disclaimer, the term of this patent is extended or adjusted under 35 U.S.C. 154(b) by 423 days.

(21) Appl. No.: 12/711,514

(22) Filed: Feb. 24, 2010

(65) Prior Publication Data

US 2010/0214421 A1 Aug. 26, 2010

Related U.S. Application Data

(60) Provisional application No. 61/208,625, filed on Feb. 26, 2009.

(51) Int. Cl.
H04N 5/228 (2006.01)
H04N 9/73 (2006.01)
H04N 17/00 (2006.01)
H04N 17/02 (2006.01)
G06K 9/00 (2006.01)

(52) U.S. Cl. ............... 348/228.1; 348/222.1; 348/180; 348/182; 348/188; 382/162; 382/167

(58) Field of Classification Search .......... 348/180–194, 348/207.1, 222.1–228.1; 382/162–167
See application file for complete search history.

(56) References Cited

U.S. PATENT DOCUMENTS

| 5,852,675 | A  | * | 12/1998 | Matsuo et al. ........... 382/167 |
| 6,549,653 | B1 |   | 4/2003  | Osawa et al. |
| 6,690,822 | B1 |   | 2/2004  | Chen et al. |
| 6,766,050 | B1 |   | 7/2004  | Saikawa et al. |
| 6,856,354 | B1 | * | 2/2005  | Ohsawa ................. 348/370 |
| 6,888,963 | B2 |   | 5/2005  | Nichogi |
| 7,010,162 | B2 |   | 3/2006  | Osawa et al. |
| 7,020,331 | B2 |   | 3/2006  | Saikawa et al. |
| 7,113,307 | B1 | * | 9/2006  | Ohkubo ................. 358/1.9 |
| 7,136,187 | B1 | * | 11/2006 | Ohkubo ................. 358/1.9 |
| 7,251,362 | B2 | * | 7/2007  | Osawa et al. ............ 382/167 |
| 8,026,942 | B2 | * | 9/2011  | Payonk et al. ............. 348/77 |
| 8,103,094 | B2 | * | 1/2012  | Wilensky ................. 382/167 |
| 8,107,696 | B2 | * | 1/2012  | Pote et al. ............... 382/128 |
| 2002/0122589 | A1 |   | 9/2002  | Reiman et al. ........... 382/167 |
| 2004/0208363 | A1 | * | 10/2004 | Berge et al. .............. 382/167 |
| 2004/0218810 | A1 | * | 11/2004 | Momma ................. 382/162 |

(Continued)

OTHER PUBLICATIONS

Yamamoto et al., "Derivation and Clinical Application of Special Imaging by Means of Digital Cameras and Image J Freeware for Quantification of Erythema and Pigmentation," Skin Research and Technology, 2008, vol. 14, pp. 26-34.

(Continued)

*Primary Examiner* — Aung S Moe
*Assistant Examiner* — Chia-Wei A Chen
(74) *Attorney, Agent, or Firm* — Brinks Hofer Gilson & Lione; G. Peter Nichols

(57) ABSTRACT

A process for measuring skin color parameters from a digital photograph using novel color correction algorithms is described. The process includes measuring color values of a digital color photo, correcting the color deviation of each picture to that of a standard color, and converting the corrected RGB values and generating an output that is useful to L*a*b* values to describe changes in the color properties of the photographed skin.

23 Claims, 14 Drawing Sheets

U.S. PATENT DOCUMENTS

| | | | |
|---|---|---|---|
| 2005/0018226 A1 | 1/2005 | Chiba | |
| 2006/0061841 A1* | 3/2006 | Osawa et al. | 358/518 |
| 2006/0093211 A1* | 5/2006 | Matsuura | 382/162 |
| 2006/0133654 A1* | 6/2006 | Nakanishi et al. | 382/118 |
| 2007/0104472 A1* | 5/2007 | Quan et al. | 396/79 |
| 2008/0144056 A1* | 6/2008 | Ciurea et al. | 358/1.9 |
| 2010/0284610 A1* | 11/2010 | Yoshikawa | 382/164 |

OTHER PUBLICATIONS

Pladellorens et al., "*A Device for the Color Measurement and Detection of Spots on the Skin,*" Skin Research and Technology, 2008, vol. 14, pp. 65-70, 2008.

N. Konish et al., "*New Approach to the Evaluation of Skin Color of Pigmentary Lesions Using Skin Tone Color Scale,*" Journal of Dermatology, 2007, vol. 34, pp. 441-446.

Miyamoto et al., "*Development of a Digital Imaging System for Objective Measurement of Hyperpigmented Spots on the Face*", In Bioengineering of the Skin: Skin Imaging & Anaylsis, Second Edition, 2006, pp. 209-219.

Coelho et al., "*Quantification of UV-Induced Erythema and Pigmentation Using Computer-Assisted Digital Image Evaluation*", Photochemistry and Photobiology, 2006; vol. 82, pp. 651-655.

Harville et al., "*Consistent Image-Based Measurement and Classification of Skin Color*", Hewlett-Packard Laboratories, HPL-2005-99, May 2005, 5 pages total.

A. Kawada et al., "*A New Approach to the Evaluation of Whitening Effect of a Cosmetic Using Computer Analysis of Video-Captured Image,*" Journal of Dermatological Science, vol. 29, (2002), pp. 10-18.

Haeghen et al., "*An Imaging System With Calibrated Color Image Acquisition for Use in Dermatology*", IEEE Transactions on Medical Imaging, vol. 19, No. 7, Jul. 2000, pp. 722-730.

Chang et al., "*RGB Calibration for Color Image Analysis in Machine Vision,*" IEEE Transactions on Image Processing, vol. 5, No. 10, Oct. 1996, pp. 1414-1422.

\* cited by examiner

APPARATUS AND METHOD FOR CORRECTING DIGITAL COLOR PHOTOGRAPHS

This application claims priority under 35 U.S.C §119 to U.S. provisional patent application 61/208,625 entitled "Skin Color Measurement," which was filed on Feb. 26, 2009. Applicant incorporates the entire contents of U.S. provisional patent application 61/208,625 by reference.

This invention relates generally to color correction of digital photographs. This invention further relates to the use of color corrected photographs for assessment of skin color changes.

Skin color may be quantified based upon a narrow-band or broad-band spectrophotometer such as spectrophotometer SP64 (X-Rite, USA) or DermaSpectrometer (Cortex Technology, Denmark), a tristimulus colorimeter such as Chroma-Meter (Minolta, Japan), a video-microscope coupled with a computer based image analysis system, or clinical grading by trained a clinician. These techniques may be used for skin color measurement with limited success.

A ChromaMeter may provide a convenient way to measure the surface color of skin and may provide an accurate color measurement of an inert object. One key drawback with the ChromaMeter may be variability when measuring skin color in vivo. The variability of in vivo skin color measurements with a ChromaMeter may be due to the direct physical contact of the ChromaMeter's color sensing probe with the skin. The color of a person's skin may change when the flesh is pressed to the ChromaMeter. If this occurs, the red color tends to reduce drastically due to the change in blood flow to the skin. Other in vivo skin color measuring instruments share the same drawback. In FIG. 5 and FIG. 6, the measurement variability of a Chromameter on an inert color standard and on the skin of a test subject is depicted.

The Chromameter measures a small measurement area, which may be less than 1 centimeter (cm) in diameter. To measure a larger area of skin, multiple measurements are needed that may be tedious and increase variability. If multiple measurements are carried out by a third-party lab, there may be no measurement history traceable for quality control. The variability in results may cause scattered color measurements that are not usable in a clinical report. Different researchers and companies approach the problem differently; however, no commercial system is available to carry out picture correction and color measurement in a convenient way. A number of photo-processing software programs will indicate the RGB and L*a*b* values of a single pixel. Obtaining an average value and exporting captured data, in a form for formation to other software for further analysis may be rather tedious.

Examples of related art may include: "Derivation and Clinical Application of Special Imaging by Operations and Features of Digital Cameras and Imagej Freeware for Quantification of Erythema and Pigmentation," T. Yamamoto et al, *Skin Research and Technology*, vol. 14, pages 26-34, 2008; "A Device for the Color Measurement and Detection of Spots on The Skin," J. Pladellorens et al, *Skin Research and Technology*, vol. 14, pages 65-70, 2008; "A New Approach to the Evaluation of Whitening Effect of a Cosmetic Using Computer Analysis of Video-Captured Image," A. Kawada et al, *Journal of Dermatological Science*, vol. 29, pages 10-18, 2002; "Development of a Digital Imaging System for Objective Measurement of Hyperpigmented Spots on the Face," K. Miyamoto et al. "*In Bioengineering of the Skin: Skin Imaging & Analysis,*" 2nd Edition. Pages 209-219. 2007; and "New Approach to the Evaluation of Skin Color of Pigmentary Lesions Using Skin Tone Color Scale," N. Konishi et al. *Journal of Dermatology*, vol. 34, pages 441-446, 2007.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

The systems described in this specification may be better understood with reference to the following drawings and description. The components in the figures are not necessarily to scale, emphasis instead being placed upon illustrating the principles of the invention. Moreover, in the figures, like referenced numerals designate corresponding parts throughout the different views.

As one example, a color correction system color corrects digital color photographs that include an image of skin and an image of one or more color chip. The color correction system receives measurements of the chip color values for each of the one or more color chips and skin color measurements for a site of interest of the skin on each of the photographs. The color correction system averages the skin color measurements to obtain a target skin color for the skin in the digital color photographs. The color correction system also averages the chip color values for each of the one or more chips to obtain composite chip color values of each of the one or more chips in each of the digital color photographs. Based upon the target skin color and the composite chip color values, the processor calculates composite factors for each of the digital photographs. Thereafter, reconstructed or color corrected skin color may be determined for each of the digital photograph based upon the composite factors and measured skin color associated with each digital color photograph.

The processor may use the reconstructed skin color in combination with the target skin color to generate correction factors for each of the digital color photographs. Using the correction factors of a respective digital color photograph, the processor may color correct the respective digital color photograph?

As one example, the one or more color chips may include a red, a green, and a blue color chip. In another example, the one or more color chips may include a gray color chip or a skin tone color chip. In an alternative example, a change in skin color of the test subject may be determined before and after treatment by a test product of interest. Alternatively or in addition, the process may quantify the efficacy of the test product of interest based upon a change in skin color. In still other examples, a matrix relationship used for calculating composite factors is of dimensions less than or greater than 3 to support use of an arbitrary color chip.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 13 depicts a screen shot of a Microsoft EXCEL macro calculating composite factors.

FIG. 14 depicts a screen shot of the result page of a Microsoft EXCEL macro of FIG. 13.

The visual appearance of skin is not physically altered when its color is detected when using a digital camera. Unlike a digital color camera, skin color measuring instruments such as a colorimeter and ChromaMeter require physical contact with the skin in order to adequately sense the color properties of the skin. Digital photography provides a non-contacting operation for sensing skin color in viva Accordingly, a digital color camera has the advantage of not physically altering the color of the skin to be detected.

Figure 12:
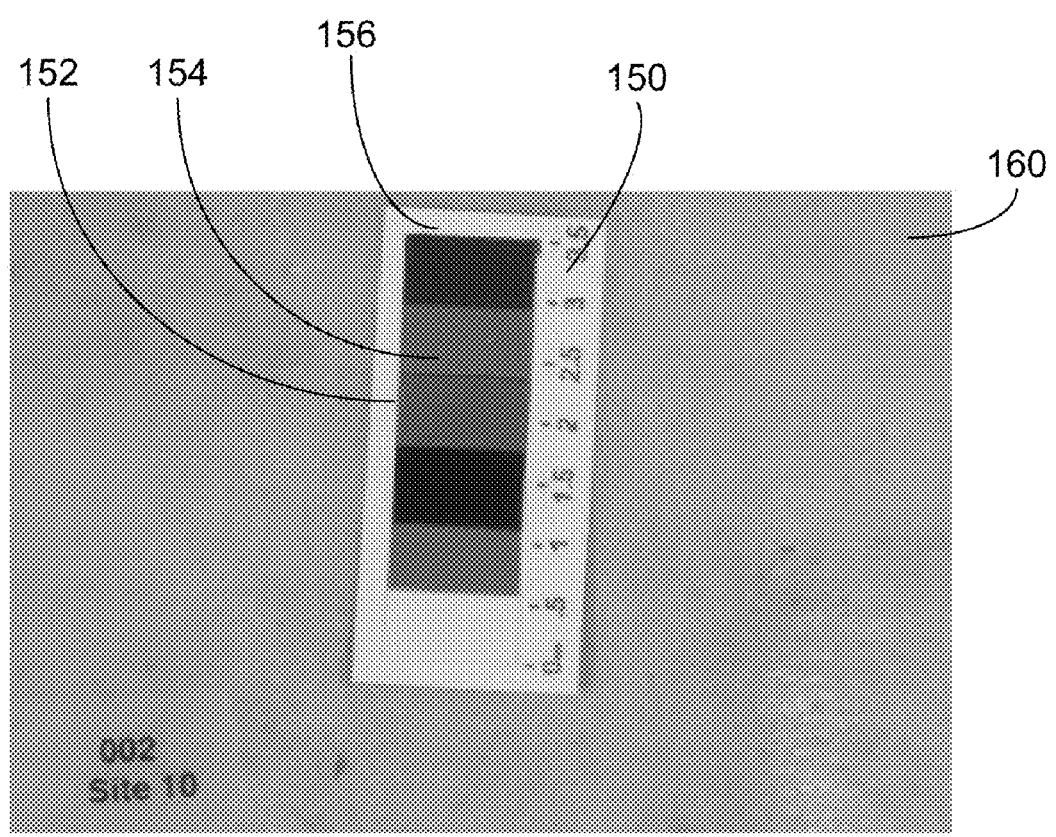
FIG. 12 is a digital color photograph containing a set of color chips.

Moreover, a digital picture taken from a distance from the skin avoids measurement variability resulting from skin contact. It may also serve as an archive to show the history of the photographed skin. Correcting the color of a picture after it is taken provides a more definite solution to the accuracy of color measurement in conjunction with control of illumination during picture capturing process. Also, using color chips standards provides accurate color correction. For example, a test strip 151 shown in FIG. 12, may include a red color chip red 152, a green color chip 154, a blue color chip 156, a black color chip 157, or a gray color chip 158. The test strip 151 may be proximate to a skin site 161. As described herein, measurements and operations involving the color chips may be done on a selected number, all, or some of the color chips. For example, the gray test chip 158 and the black color chip 157 may be used for light correction while the red test chip 152, the green test chip 154, and the blue test chip 156 may be used for color correction of the digital color photographs.

Figure 1:
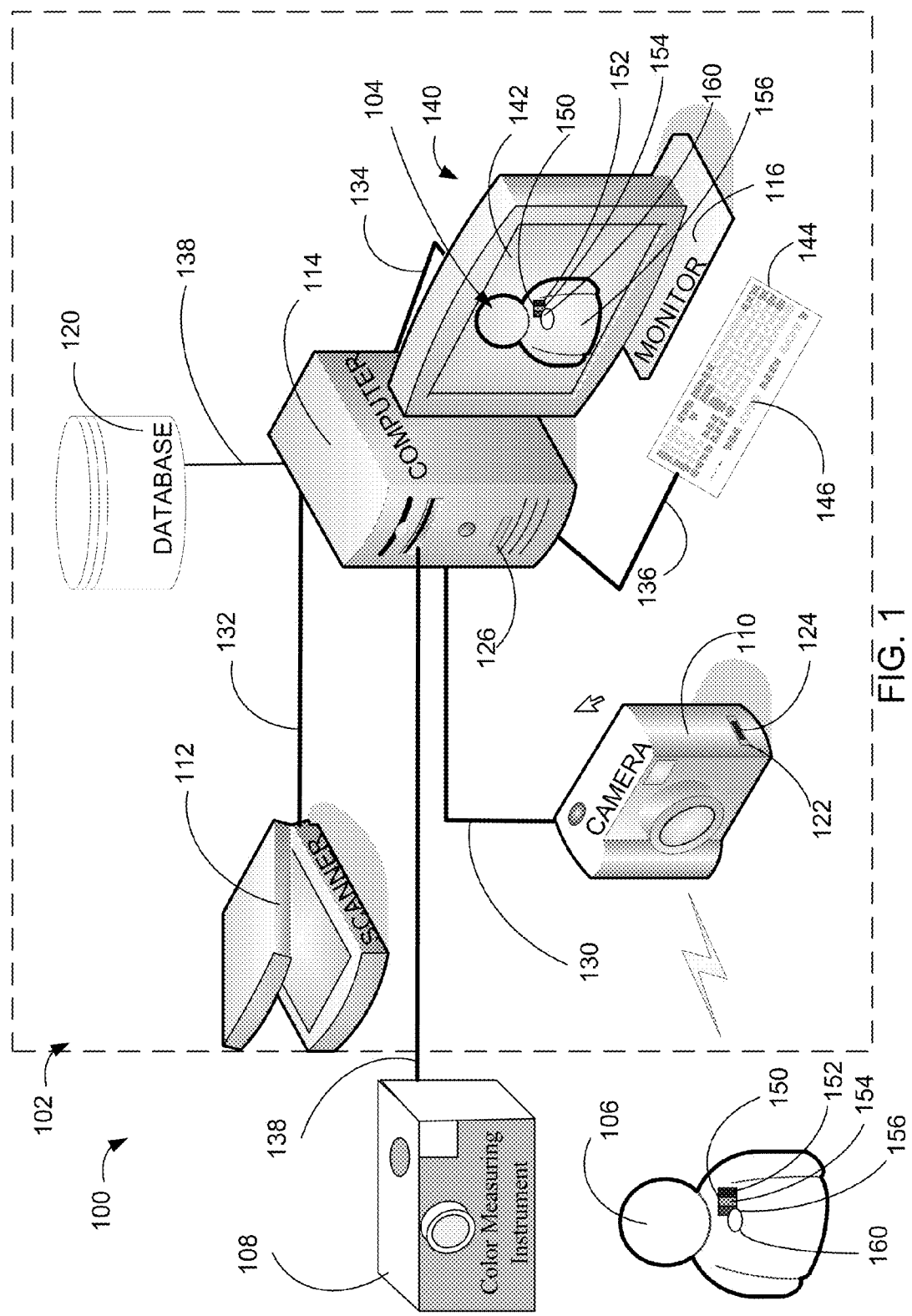
FIG. 1 depicts one example of a system for color correcting color digital images.

In FIG. 1, a color correction system 100 is configured to color correct digital images 104. The color correction of the digital images 104 may be based upon a calculation of color correction factors for selected portions of skin in a region of interest 160 on an individual or test subject 106 shown in the digital image 104. The color correction system 100 may include a digital image color correction system 102 and a color measuring instrument 108. The color measuring instrument or device 108 may be a colorimeter, a ChromaMeter, or other suitable color measuring instrument, as discussed above.

The digital image color correction system 102 may include a digital camera 110. The digital image color correction system 102 may further include a computer 114 coupled to the color measuring device 108, a scanner 112, a monitor 116, and a database server 120. The digital camera 110 may be in communication with the computer 114 or other devices via a cable or network 130. The scanner 112 may be in communication with computer 114 and data base 120 via a cable or network connection 132. The computer 114 may be in communication with a database server 120, a monitor 116, a keyboard 144, or a mouse 146 or each of them via a cable and/or network connections 138, 134, and 136, respectively.

For example, the cable or network connections 130, 132, 134, 136, and 138 may be a wireless link, an optical link, Ethernet, USB 1.0, USB 2.0, IEEE1394, Bluetooth, 802.11a/b/g/n, or other similar interconnect buses, links, or networks. As an example, the scanner 112 may be in communication with the computer 114 via a wireless link or an optical link.

As a further example, the computer 114 may also be in communication with the monitor 116 via a video cable 134. The video cable 134 may be a VESA® standard cable, a HDMI cable, a DVI cable, a component video RCA cable, an S-Video cable, or an RGB/VGA® cable. Alternatively, the video cable 134 may include an analog cable, a digital cable, or an optical link. Data transferred over the video cable 134 may be either analog data or digital data.

The digital camera 110 may be a digital single-lens reflex camera (DSLR). The digital camera 110 may be a high resolution DSLR camera that includes a CCD or CMOS sensor. As an example, the digital camera 110 may be Nikon D series camera. Consistent lighting may be desired, and both regular and macro lenses may used to take photographs. Accordingly, the digital camera 110 may include exposure modes, zoom lenses, image stabilization, smart camera features, focus controls, image shooting modes, light sensitivity adjustments (ISO), flash features, an LCD display, and various image file formats.

Alternatively, the camera 110 may be an analog color camera. The photographic images captured by the camera 110 may be printed out on photographic paper. The image captured on the photographic paper may be scanned by a scanner 112 to generate a digitized image or digital image data that may be processed by a computer 114. The digital images data may be stored in the memory of the computer 114. Alternatively, the digital images 104 may be stored in an external memory or in the database 120.

The digital camera 110 may be used to take digital photographs of an image of skin in a region of interest 160 to capture the skin color of the skin in the region of interest 160. As an example, the digital camera 110 may capture photographs that include the natural or uncorrected skin color of the skin in the region of interest 160. The digital photographs may further include the image of a test strip 150 having reference colors arranged in patches or strips on the test strip 150. For example, the test strip 150 may include small paper stripes or clips imprinted with a gray and three basic colors such as red, green, and blue (RGB).

As one example depicted in FIG. 1, the test strip 150 may include a plurality of color strips disposed upon the surface of the test strip 150. As another example, the test strip 150 may include a red chip 152, a green chip 154, and a blue chip 156. Although the test strip 150 depicts three strips or chips 152, 154, and 156, the test strip 150 may include one or more color chips having shades of primary colors, shades of gray, white, black, and flesh colors. As another example, a flesh color on the test strip 150 may be selected based upon the skin color of the test subject 106. The test strip may be positioned proximate the skin in the region of interest 160 prior to taking a photograph to capture digital image data for the image of skin of the region of interest 160.

Each of the digital photographs may include digital image data of a skin site in the region of interest 160 and the test strip 150 proximate to the skin in the region of interest 160. The digital image data captured by the camera may include uncompressed image data or compressed image data. As an example, the image data may be in a JPEG format, TIFF format, GIF format, a TIFF format, or some other compressed or compressible format. The digital camera 110 may save the digital image data in a memory associated with the digital camera 110, the computer 114, or a network drive or database server 120.

As one example, the digital camera 110 may include an image memory module or chip 124 inserted into a sock or module connector 122, where the image memory module or chip is removable. The image memory module or chip 124 may be removed from the digital camera 110 and inserted into a compatible socket or module connector 126 of the computer 114. Thereafter, the computer 114 may obtain (download) the digital image data stored on the image memory module or chip 124. The obtained the digital images 104 may be stored in the memory of the computer 114, in a database 120, or some other memory associated with the computer 114.

As another example, the digital camera 110 may transfer the digital image data via a cable or network 130 for each of the photographs to the computer 114. The computer 114 may store the digital image data in a local memory, external memory, or in a database 120. As one example, the computer 114 may be configured to permit the camera 110 to directly download digital image data of the digital color photographs directly to the database 120, the memory of computer 114, or an external memory (not shown) attached to the computer 114. As an alternative example, the camera may be a device configured to download the digital image under the control of the computer 114.

The digital image color correction system 102 may also include a scanner 112. The scanner may digitize previously printed color photos to create digital image data similar to the digital image data captured by the digital camera 110. Similar to the digital camera 110, the scanner 112 may digitize an image of a printed photograph to create digital image data that includes an image of a test strip 150 and skin of a skin site in a region of interest 160. The digital image data may be sent to the computer 114 for storage and later use.

The computer 114 may be a personal computer (PC), a hand held device, a pocket PC, a personal computer, laptop, tablet personal computer (PC), or a work station. The computer 114 may include one or more computer processors, controllers, or microcontrollers configured to execute software stored on a memory or hard drive. The software may include computer executable program code stored in a tangible memory medium accessible by the processor of the computer 114. The computer 114 may include random access memory, flash memory, a flash ROM interface, SRAM, hard drive, CD-ROM drive or any other data and instruction storage device. The computer 114 may include a graphics circuit for generating a user interface 140 on a display 142 of a monitor 116.

The user interface 140 may include a graphical user interface 144. The display 142 may include a touch screen functionality to permit a user to select features or functions of the digital image color correction system 102. As an example, a user of the digital image color correction system 102 may use a stylus or a finger to select user applications and functions, digital images 104, and to identify selected areas of a digital image 104. In addition, the computer 114 may be configured to incorporate the keyboard 144 and the mouse 146 into the operations of the user interface 140. Although not depicted in FIG. 1, the computer 114 and monitor 116 may be integrated into a single device.

The computer 114 may also be coupled to a keyboard 144, which includes an integrated mouse 146. Alternatively, the mouse 146 may be a separate input/output (I/O) device in communication with the computer 114. As another example, the mouse 146 may be a separate input/output (I/O) device in communication with the computer 114.

Figure 2:
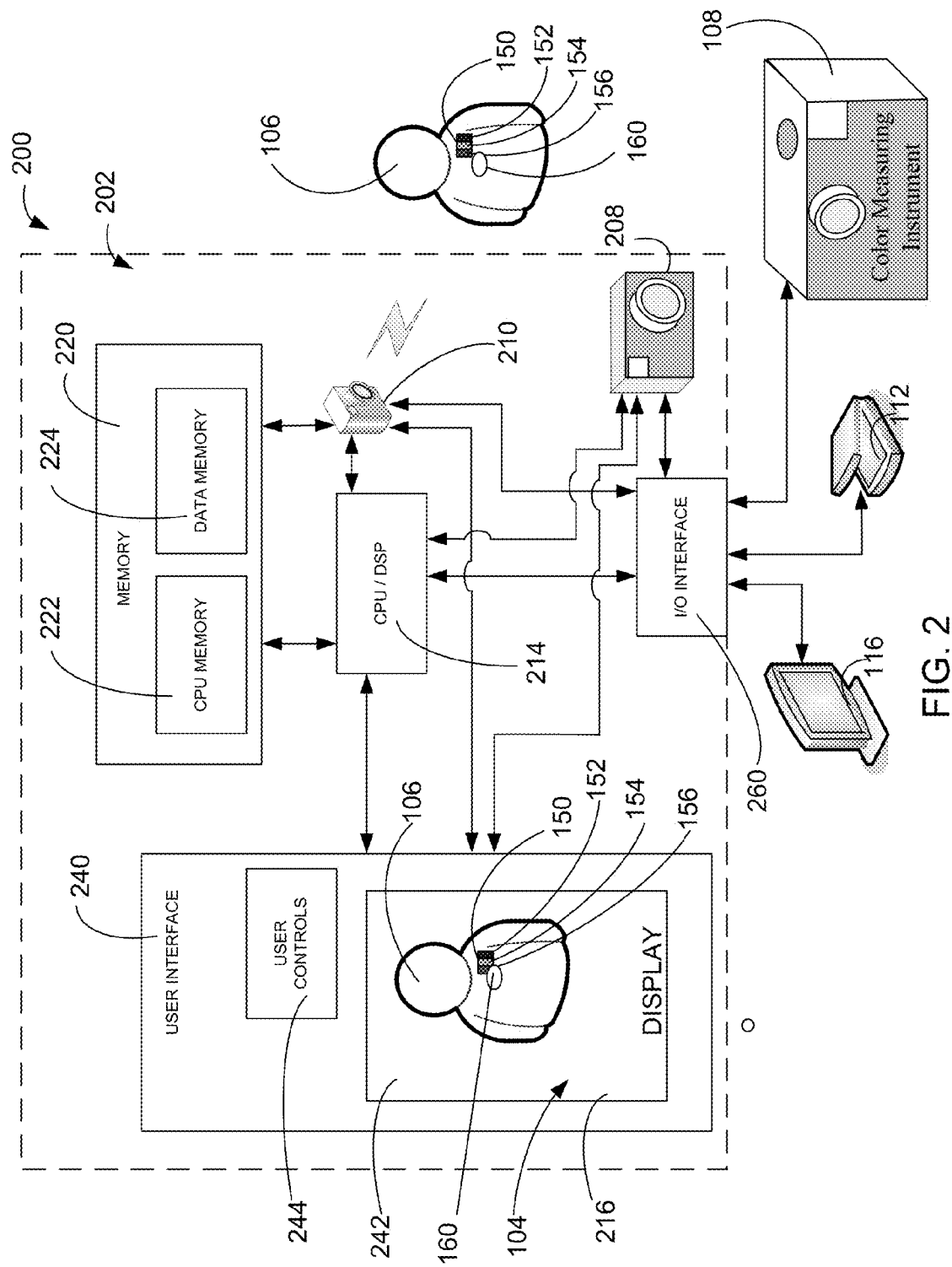
FIG. 2 depicts another example of a system for color correcting digital images.

In FIG. 2, a color correction system 200 may include a digital image color correction device 202. The features provided and function carried out by the color correction system or device 200 may be similar in nature and function to the color correction system 100. In addition, like elements in the color correction system 200 may carry out like functions as corresponding elements or devices or apparatuses in the color correction system 100. For example, the color measuring instrument 208, the digicam 210, the display 216, and the memory 220 of FIG. 2 may be similar in operation or function as the color measuring instrument 108, the camera 110, the computer processor and memory of the computer 114 of FIG. 1. The user interface 240 may operate in a similar fashion as the combination of the monitor 116, the user interface 140, the keyboard 142, and the mouse 146.

The digital image color correction device 202 may include a digicam 210 incorporated into the color correction system 200. The digicam 210 may be coupled to a processor 214. The digicam 210 may include functionality and features similarly to the digital color camera 110, as previously described. The digicam 210 may be in communication with a memory 220, a user interface 240, and an input/output (I/O) interface 260.

A processor 214 may include a central processing unit, (CPU), and/or a digital signal processor, (DSP). As an example, the processor 214 may include one or more DSP cores configured to interoperate with the CPU core. In addition, similar to the processor of the computer 114, the processor 214 may include memory and various interfaces into processor memory, a local memory caching system, and the memory 220. In some examples, the processor 214 includes a shared core memory to permit passage of data and instructions between the CPU 214 core and the DSP core without storing data information to the memory 220. In some exemplary systems, the processor 214 includes a shared core memory to permit passage of data and instructions between the CPU 214 core and the DFP core without storing data information to the memory 220.

The display 216 may be configured to display information to a user of the digital image color correction device 202. The display 216 may further be configured to display images similar to an LCD display on a digital camera 110. The display 216 may be part of the user interface 240. Alternatively, the digital image color correction device 202 may utilize an external monitor 116 to provide a graphical user interface.

The memory 220 may be in communication with the processor 214. The memory 220 may include a dedicated CPU memory 222 and a dedicated date memory 224. Alternatively, the memory 220 may permit a single memory addressing scheme controlled by a processor 214. For example, the processor 214 may control the digicam 210 to store image data into a portion of the memory 220 allocated for storing digital camera image data.

The user interface 240 may be in communication with the digicam 210 and the processor 214. In other example systems, the user interface 240 may include a display 242 and user controls 244. Similar to the monitor 116 or a LCD display of camera 110, the display 242 may display the test subject 106 being photographed by the digicam 210. In addition, the display 242 may display user controls 242 including, but not limited to, menus, control buttons, radio buttons, and text entry fields, and scroll controls. In addition, the user controls 242 may include control buttons to control the operation of the digicam 210.

The color correction system or device 200 may also include a color measurement instrument 208 in communication with the processor 214 and the user interface 240. Similar to the operation of the color measurement instrument 108 depicted in FIG. 1, the color measurement device 208 may be configured by the processor 214 to permit a user to capture color data or information for the color chips and/or the skin color in an area of interest on the test subject. In addition, color data or information for each of the color chips and/or the skin at the skin site of interest of the test subject may be taken from the digital color photographs. The measured color data or information may be stored in a memory 220. The user interface 240 may display measured color data captured by the color measurement instrument 208.

The color correction system or device 200 may also include an input/output (I/O) interface 260 that may be configured to couple to an external color measurement instrument 108, external scanner 112, or an external monitor 116. In particular, as one example of many, the user interface display 242 may be displayed upon monitor 116. Likewise, the scanner 112 may receive analog pictures that are digitized and provided to processor 214 for processing. Similar to an operation of the color correction system 100, the external color correction instrument 108 may provide color measurements of the skin color in the region of interest 160 proximate to the test strip 150 and the color data or information for the test chips disposed upon the test strip 150.

As an example, a user of the color correction system 200 may determine to use an external color measurement instrument or device, which may be coupled via the I/O interface 260 to the digital image color correction device 202. Similar to the color measurement device 208, the processor 214 may control the capture of measured color data captured by the color measurement instrument 108.

Figure 3:
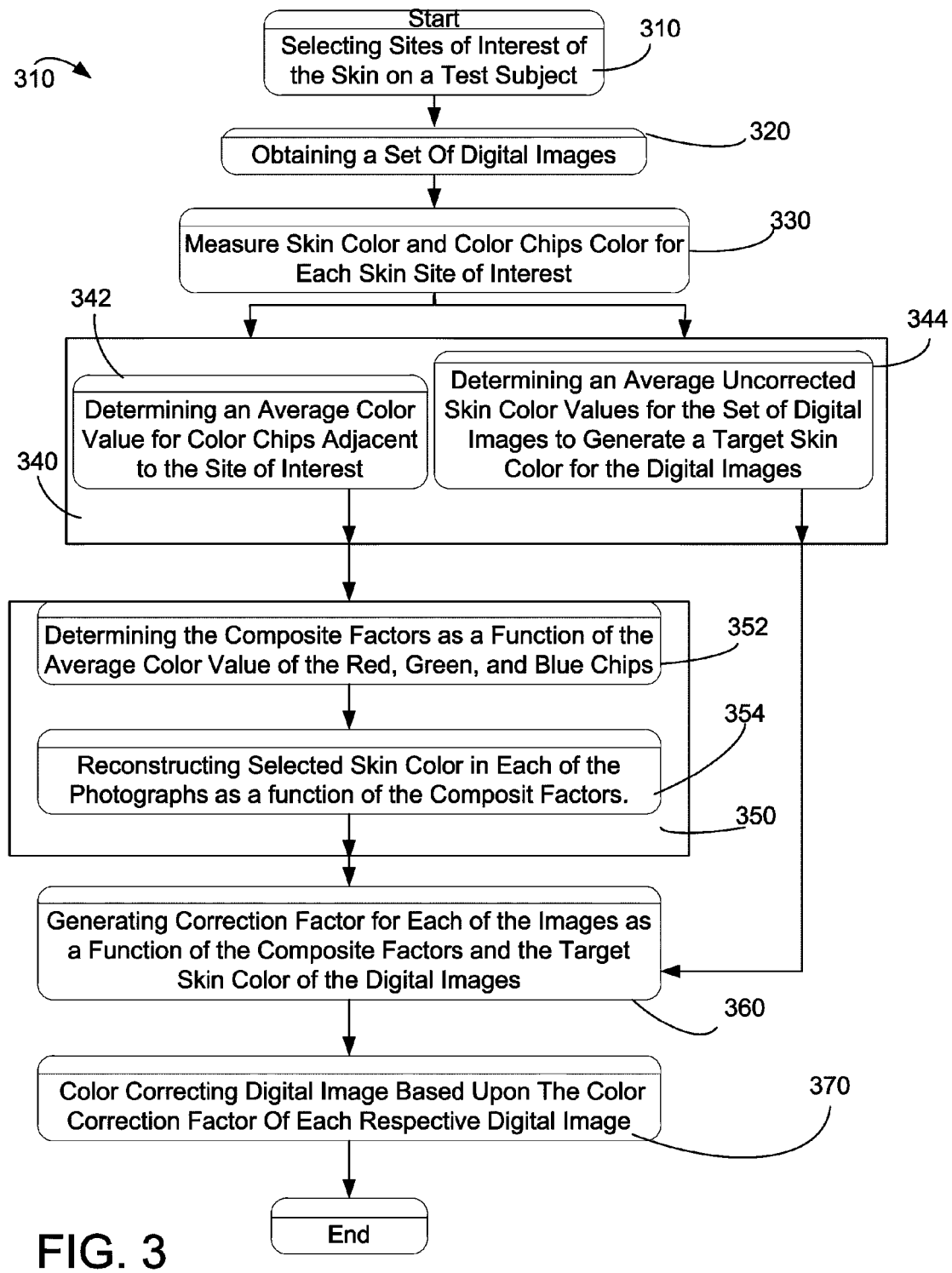
FIG. 3 depicts an operation of color correcting digital images with reference to the system depicted in FIG. 2.

In FIG. 3, a color correction operation 300 is described with respect to the color correction system 200 and the digital image color correction device 202. Although the color correction method 300 is described with respect to the color correction system 200, the color correction method 300 is not limited to the color correction system 200 and may be implemented and operated on the color correction system 100, where like parts perform like functions. As discussed above, for example, functions or operations carried out in the components of color correction system 200 may correspond to similar functions executed or carried out by the components of color correction system 100. The algorithms and the functions executed on the processor 214 may be implemented by a program stored in the memory 220 including computer executable program code similar to computer program code stored in a memory associated with the computer 114, which includes the computer program code executable on the processor of the computer 114. Functions of the digicam 210 may be accomplished, at least in part, by the digital color camera 110 or the scanner 112.

The digital image color correction device 202 may use one or more reference colors for comparison to the skin color of the flesh in the region of interest 160. As an example, the reference colors may include three basic colors (red, green, and blue) to accurately describe the changes in three color components (R, G, and B). This approach provides multiple dimensions to quantify and correct the color of a picture.

As an example, the memory 220 may include computer executable program code to instruct the processor 214 to carry out operations using the RGB values measured from the clinical operation to perform color correction of the skin color in each of the regions of interest for each of the digital color photographs. Alternatively, in the case of the color correction system 100, the computer 114 may include an EXCEL spreadsheet macro stored in memory. The memory of the computer 114 may include computer executable instructions to execute the operations of the EXCEL Spread sheet macro to carry out calculations using the RGB values captured from the clinical digital color photographs, which are described below with references to the color correction system 200.

At act 310 of the color correction operation 300, a user of the digital image color correction device 202 may select one or more sites of interest of the skin 160 of a test subject to be photographed and analyzed. A test strip may be placed proximate to each site of interest on the skin of the test subject 106. Thereafter, the color correction operation 300 may proceed to act 320.

At act 320, the user may obtain photographs of the sites of interest using a digital color camera 110. The processor 214 may act cooperatively with the user interface 240 to take a desired number of digital color photographs at each of the selected sites of interest 160. Each of the digital color photographs may include an image of skin in the site of interest 160 and an image of the test strip 150 proximate to the site of interest 160.

The digicam 210 captures and stores the image data for each of the digital color photographs in memory 220. Alternatively, the digital image data may be sent to the processor 214, which stores the digital image data in the memory 220. Alternatively, the scanner 112 may provide digitized color photographs. Thereafter, the operation 300 proceeds to act 330.

At act 330, the user may measure the color values of each of the color chips on each of the test strips used in the digital color photographs. For example, the color values for each of the color chips may be obtained from the digital color photographs. As another example, the color values for each of the color chips may be obtained with a color measuring instrument 208 or 108. The color data for each of the color chips in a respective digital color photograph, also referred to as a selected digital color photograph, an operative digital color photograph, or an operable digital color photograph, may be stored in the memory 220 in association with the digital image data corresponding to the operable digital color photograph. In addition, the user may measure the skin color in the region of interest 160 in each of the digital color photographs, as previously identified. The skin color data from the digital color photographs may be stored in the memory 220 in association with the image data and the color data for each of the color chips in the digital image of the respective digital color photograph. Thereafter, the operation 300 proceeds to act 340.

At act 340, the processor 214 determines a composite color for the color chips and a target skin color corresponding to the operable digital color photograph. To determine a composite color for the color chips in the image of color chips, the processor may obtain or receive measured color values for each of the color chips on all the digital color photographs under consideration. As an example, the processor may receive color values for the red color chip 152, the green color chip 154, and the blue color chip 156, (RGB values), of the test strip 150 from each of the digital color photographs under consideration. The act 340 may be sub-divided into acts 342 and 344.

At act 342, the processor 214 may generate composite or average color values for each of the chips in the test strips disposed in the region of interest 160 for each digital color photograph of interest. To determine a composite color for the color chips in the image of color chips, the processor may receive measured color values from each of the digital color photographs for each of the color chips on all the digital color photographs under consideration. As an example, to generate the composite color operation for the RGB values, the processor may calculate average RGB values for the three color chips in test strip 150 based upon the measured color value of the color chips that appear in the image of color chips in the digital color photographs. After the measured color values of each of the chips is obtained, the processor may determine the average color value for the red chip based upon the measured color values of the red chip in each of the photographs under consideration. Likewise, the average color value for the green and blue chips in the digital color photographs under consideration may likewise be calculated. As a non-limiting example, twenty-six photographs were analyzed in Example 1, which is described below.

At act 344, the average uncorrected skin color values or target skin color for a set of digital images may be used to generate a target skin color for the digital color photographs. As an example, the processor 214 may obtain or receive from the digital color photographs one or more sets of measured color values of the skin for each skin site. As an example, the measured color values may include RGB values or L*a*b* values. As another example, a user may measure the RGB values of uncorrected skin color at the skin site located in the region of interest 160, which is proximate to the color chips for each of the pictures under consideration. The processor 214 may then average the measured color values corresponding to the skin in each of the digital color photos of interest to obtain a target skin color. The processor 214 may determine an average uncorrected skin color value for the set of digital images to generate the target skin color for the digital color photographs under consideration. Thereafter, operation 300 proceeds to act 350.

At act 350, the processor 214 determines composite factors based on, for example, the average RGB values of the uncorrected skin color as the target skin color. The user interface 240 may be configured to permit a user selection to designate the operative digital color photograph or a subset of the digital color photographs to be color corrected. Thereafter, the processor reconstructs the skin color for at least one of the digital color photographs to be color corrected. Act 350 may be divided into acts 352 and 354.

At act 352, the processor may use the target skin color to determine the composite factors, $C_R$, $C_G$, and $C_B$, based on the average RGB values of each of red, green, and blue color chips in the digital color photographs of interest according to the following set of equations:

$$R_{Target,\,skin} = R_{Red}C_R + R_{Green}C_G + R_{Blue}C_B,$$

$$G_{Target,\,skin} = G_{Red}C_R + G_{Green}C_G + G_{Blue}C_B,$$

and $$B_{Target,\,skin} = B_{Red}C_R + B_{Green}C_G + B_{Blue}C_B,$$

where R, G, and B represent the average values of color parameters measured from all clinical pictures under consideration, suffixes Red, Green, and Blue indicate the type of color chips from which RGB values were measured, $C_R$, $C_G$, and $C_B$ represent the composite factors for R, G, and B, respectively.

For convenience, the above set of equations can be expressed by the following matrix equation:

$$\begin{pmatrix} R_{Target,skin} \\ G_{Target,skin} \\ B_{Target,skin} \end{pmatrix} = \begin{pmatrix} R_{Red} & R_{Green} & R_{Blue} \\ G_{Red} & G_{Green} & G_{Blue} \\ B_{Red} & B_{Green} & B_{Blue} \end{pmatrix} \begin{pmatrix} C_R \\ C_G \\ C_B \end{pmatrix},$$

that may be written in condensed form as $$S_{target\,skin\,color} = A_{color\,chips} C_{composite\,factors}.$$

To solve for $C_R$, $C_G$, and $C_B$, the following coefficient matrices are established:

$$A = \begin{pmatrix} R_{Red} & R_{Green} & R_{Blue} \\ G_{Red} & G_{Green} & G_{Blue} \\ B_{Red} & B_{Green} & B_{Blue} \end{pmatrix},$$

$$A_R = \begin{pmatrix} R_{Target,skin} & R_{Green} & R_{Blue} \\ G_{Target,skin} & G_{Green} & G_{Blue} \\ B_{Target,skin} & B_{Green} & B_{Blue} \end{pmatrix},$$

$$A_G = \begin{pmatrix} R_{Red} & R_{Target,skin} & R_{Blue} \\ G_{Red} & G_{Target,skin} & G_{Blue} \\ B_{Red} & B_{Target,skin} & B_{Blue} \end{pmatrix}, \text{ and}$$

$$A_B = \begin{pmatrix} R_{Red} & R_{Green} & R_{Target,skin} \\ G_{Red} & G_{Green} & G_{Target,skin} \\ B_{Red} & B_{Green} & B_{Target,skin} \end{pmatrix}.$$

The Composite Factors can then be Obtained from the Following Equations:

$$C_R = \frac{\det(A_R)}{\det(A)}, \quad C_G = \frac{\det(A_G)}{\det(A)}, \quad C_B = \frac{\det(A_B)}{\det(A)}.$$

Alternatively, the values of $C_R$, $C_G$, and $C_R$, may be obtained by the matrix operations:

$$C_{composite\,factors} = A_{color\,chips}^{-1} S_{target\,skin\,color}.$$

The composite factors may also be used when reconstructing a skin color from the RGB values of red, green and blue color chips from an individual picture. As another example of operation 300, matrix A and the matrix equation can be modified to allow for an arbitrary number of color chips for color correction of digital pictures of skin.

At act 354, the processor reconstructs a skin color in the region of interest 160 from the red, green and blue color chips of the operative digital color photograph, $$R_{reconstructed} = R_{Red}'C_R + R_{Green}'C_G + R_{Blue}'C_B,$$

$$G_{reconstructed} = G_{Red}'C_R + G_{Green}'C_G + G_{Blue}'C_B,$$

and $$B_{reconstructed} = B_{Red}'C_R + B_{Green}'C_G + B_{Blue}'C_B,$$

where R', G', and B' are the RGB values measured from an individual or operative digital photograph of the digital color photographs that needs color correction. The RGB values R', G', and B' may be expressed in matrix form as A', where the reconstructed skin colors are the matrix $S_{reconstructed}$. Accordingly, $$S_{reconstructed} = A'C_{Composite\,factors}.$$

Therefore, by substitution, $$S_{reconstructed} = A'A_{color\ chips}^{-1} S_{target\ skin\ color}.$$

The ratio of $S_{reconstructed}$ and $S_{target\ skin\ color}$ may define a vector of correction factors, $f_C$, $$f_C A' A_{color\ chips}^{-1} = S_{reconstructed} S_{target\ skin\ color}^{-1}.$$

Thereafter, operation 300 proceeds to act 360.

At act 360, the processor generates or determines correction factors for color correction of a picture. After a skin color is reconstructed from a picture needing correction, the color values of the corrected skin color are compared with that of the target skin color of the digital color photographs of interest. For example, the color values may be RGB values. The processor may calculate the ratios between the reconstructed skin color elements and the target skin color elements to generate the correction factors, $f_C$:

$$f_{C,red} = \frac{R_{reconstructed}}{R_{Target,skin}},$$

$$f_{C,green} = \frac{G_{reconstructed}}{G_{Target,skin}}, \text{ and}$$

$$f_{C,blue} = \frac{B_{reconstructed}}{B_{Target,skin}}.$$

As an example, the processor 214 may generate a correction factor matrix and store the correction factor matrix in memory 220 based upon the color correction factors, where $$f_C = \begin{pmatrix} f_{C,Red} & 0 & 0 \\ 0 & f_{C,Green} & 0 \\ 0 & 0 & f_{C,Green} \end{pmatrix}$$

matrix $f_C$ represents the correction factor matrix for an operative digital color photograph of the plurality of digital color photographs. The processor 214 may generate the correction factors for one of the digital color photographs to be color corrected. Alternatively, the processor 214 may create a correction factors values $f_{C,red}$, $f_{C,green}$, and $f_{C,blue}$, for each of the digital color photographs, where each correction factor corresponds to a digital color photograph to be color corrected. Thereafter, the operation 300 continues to act 370.

At act 370, the processor 214 may correct the color of the operable picture to the target color based upon the correction factors or correction factor matrix corresponding to the operable digital color matrix. With the correction factors determined above, the processor may correct the color of the operable digital color photograph needing correction to the target color by using the following equations:

$$R_{corrected} = R_{image\ data} f_{C,red},$$

$$G_{corrected} = G_{image\ data} f_{C,green},$$

and $$B_{corrected} = B_{image\ data} f_{C,blue},$$

where color corrected values of the captured digital image data for an operative or respective digital color image data. This relationship may be expressed in matrix form as:

$$P_{corrected} = P_{image\ data} f_C,$$

where $P_{image\ data}$ contains the captured digital image data for the operative digital photograph, $f_C$ contains the correction factors associated with the digital color photograph represented by the image data of $P_{image\ data}$, matrix $f_C$ includes the correction factors matrix for the operative digital photograph, and $P_{corrected}$ includes the color corrected digital image data for the operative digital color photograph.

Figure 4:
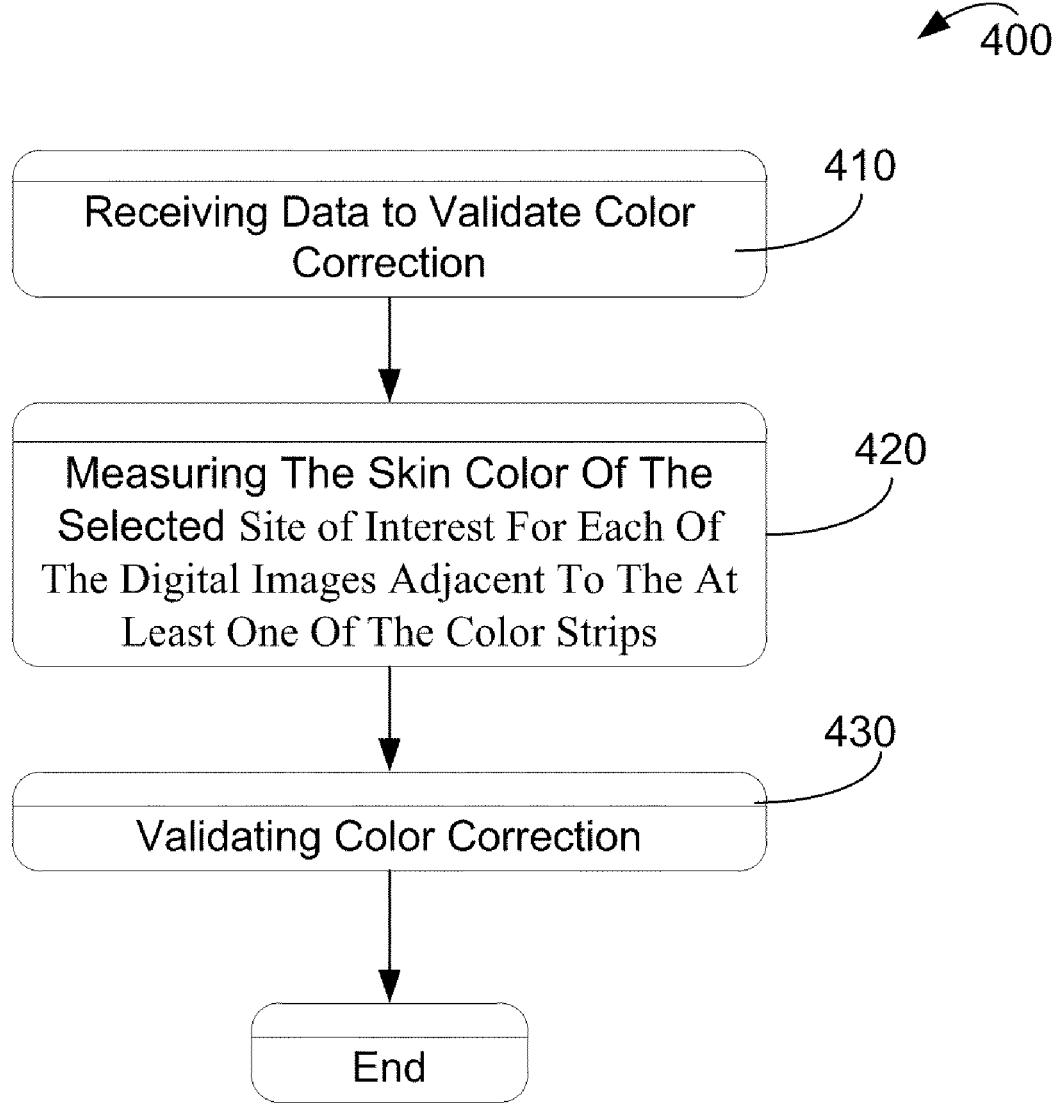
FIG. 4 Depicts an Operation of Quantifying the Quality of the Color correction of digital images with reference to the system depicted in FIG. 2.

As depicted in FIG. 4, after reconstructing the selected skin color in each of the digital color photographs of interest, the processor 214 may initiate or receive a user command via the user interface 240 to analyze the resultant color corrections and verify the quality of the resulting color correction.

At act 410, the color correction system 200 may measure the color properties of the skin sites in the color corrected photographs. From a color corrected photograph, the color properties of the skin can now be accurately measured using image analysis software executed on processor 200. As an example, the processor 214 may convert the RGB values to L*a*b* values in the CIELAB color space to be able to compare with the measurement made by using the color measuring instrument 208 or 108.

At act 420, the processor 214 validates the color correction operation results. The results of the color correction algorithms can be validated by using a physical color correction of a picture based on software executed in the processor 214. As an example, the software may be IMAGEJ freeware, or similar software. Thereafter, the measured color properties of the color chips generated by the software may be compared with the target color before and after correction. The processor 214 may calculate the weighted average of the correction factors that were determined as previously described. The formula for determining the weighted average correction factors is expressed as:

$$f_C = \left(\frac{C_R}{C_R + C_G + C_B}\right) f_{C,red} +$$

$$\left(\frac{C_G}{C_R + C_G + C_B}\right) f_{C,green} + \left(\frac{C_B}{C_R + C_G + C_B}\right) f_{C,blue}.$$

As an example, the processor 214 may multiply the color values of the operable photograph being analyzed by the average correction factor by using the "process" function of IMAGEJ freeware. Thereafter, the processor may measure the RGB values of each of red, green and blue color chips and use them to reconstruct a skin color based upon the equations previously described. The processor 214 may then compare the RGB values before and after color correction to the target skin color using the least square error method:

$$E = \sqrt{(R_{reconstructed} - R_{target,skin})^2 + (G_{reconstructed} - G_{target,skin})^2 + (B_{reconstructed} - B_{target,skin})^2}.$$

A significant decrease in error value E may be achieved from the digital color photographs after color correction.

Figure 7:
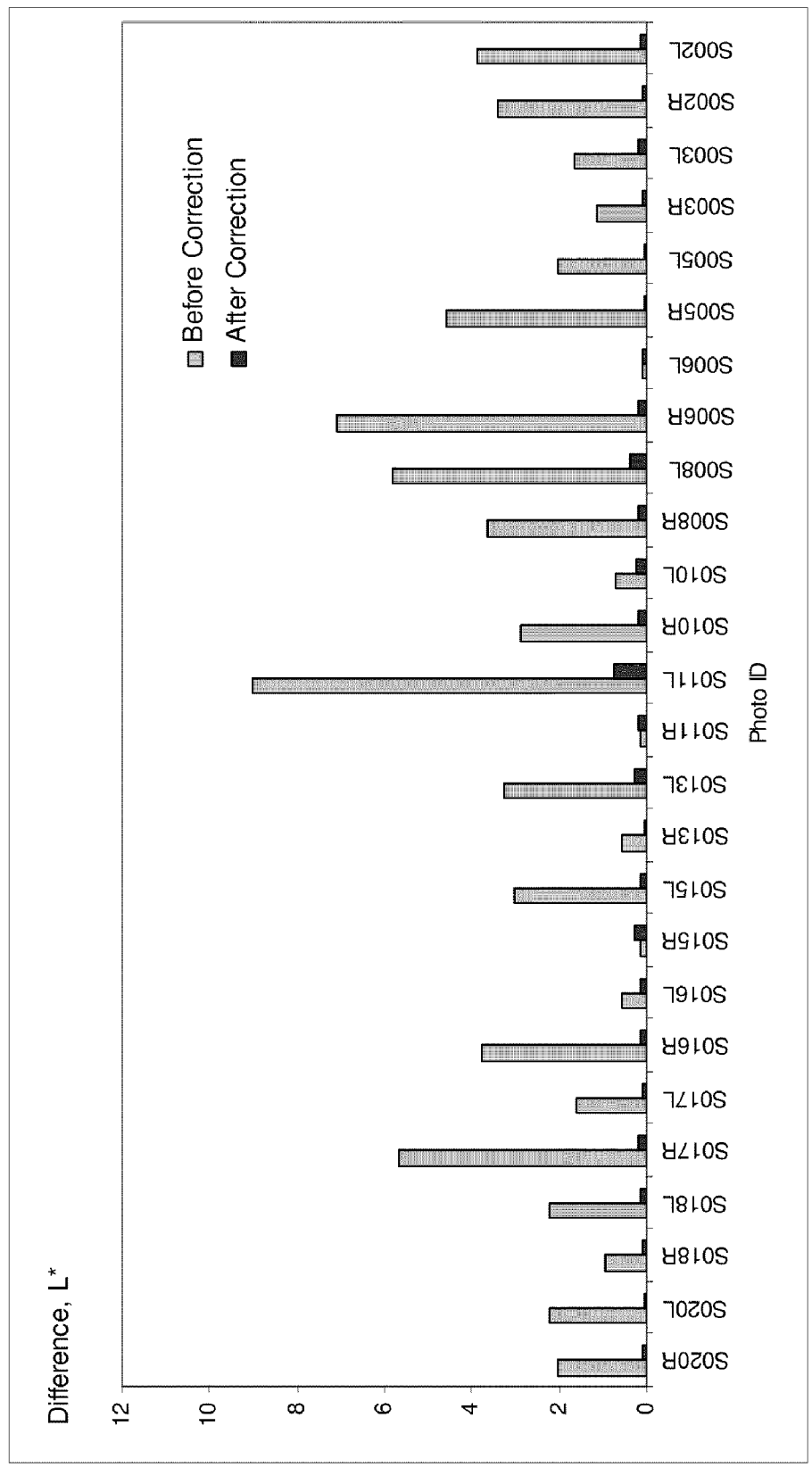
FIG. 7 depicts the deviation of L* values of color chips from a target color standard, before and after correction.

The processor 214 may also convert the color values from RGB color space to CIELAB color space and compare the L* values of the reconstructed skin color to that of the target color. The differences from the target L* value before and after correction are depicted in FIG. 7.

As another example, Example 1 illustrates the operations developed to characterize skin color properties of digital clinical photos for the purpose of quantifying the efficacy of skin lightening products. The operations examine the accuracy of RGB values measured from a picture using an image analysis software package, and then correcting the color deviation caused by lighting conditions, and finally converting the corrected RGB values to values of L*a*b* in the CIELAB color space. The following shows one example of the procedures and components of the system.

EXAMPLE 1

The user may collect digital color photographs from a clinical study. This process includes the use of a high resolution, SLR digital camera with a CCD or CMOS sensor, such as a camera in the Nikon D series. Consistent lighting is desired, and both regular or macro lenses can be used for photography. A small paper strip imprinted with a gray and three basic colors (red, green, and blue) may be placed on the skin before the photograph is taken.

The computer 114 may analyze the colors of the color stripe to assess color deviation from picture to picture caused by differences in picture taking conditions. This may be conducted with use of image analysis software such as IMAGEJ, a freeware, together with the operations of a macro on MICROSOFT EXCEL spreadsheet software executed on the computer 114. The user may select a region of interest 160 on the picture. The RGB values of the region of interest 160 may be measured using the image analysis software.

Thereafter, the color correction system 100 color corrects each of the individual pictures. Due to changes in light intensity, camera angle, and other factors that are difficult to control, the RGB values of each of the four color chips may vary considerably from picture to picture. Correcting the digital color photographs to the RGB values of a standard color may be achieved by establishing an imaginary color standard, such as a gray color or a skin color, from the average RGB values of all pictures under consideration.

The standard color may be represented by the combination of RGB values of red, green and blue color chips, as indicated by a matrix equation of the contributions of R, G, and B values from red, green and blue color chips, as previously described. Therefore, each set of color chips on a picture may be used to reconstruct an imaginary skin tone which, when compared with that of the target, displays the deviation of this picture in color properties from the color standard. A correction factor can then be determined and the RGB values are corrected to obtain more accurate values.

Figure 13:
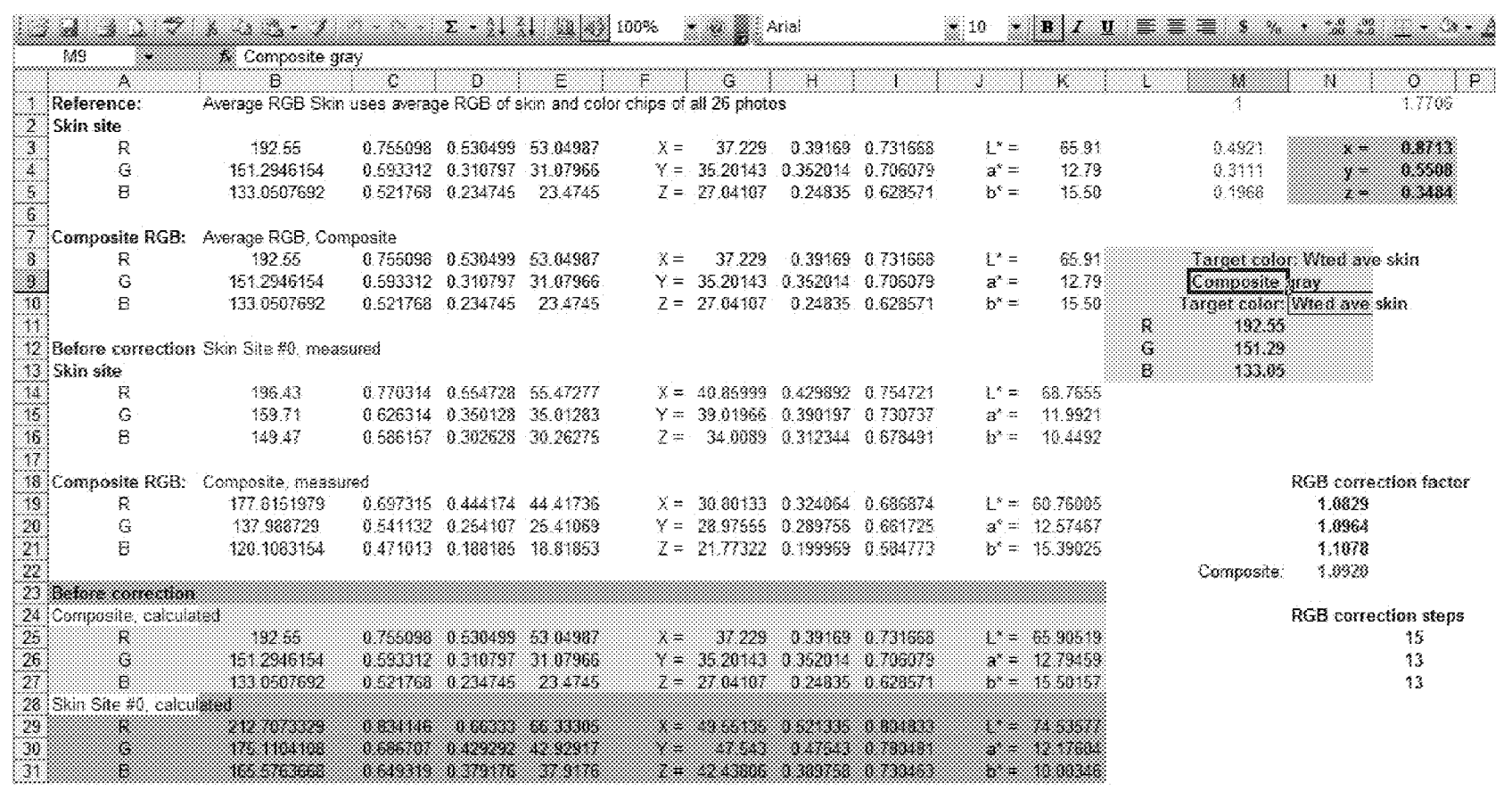
Figure 14:
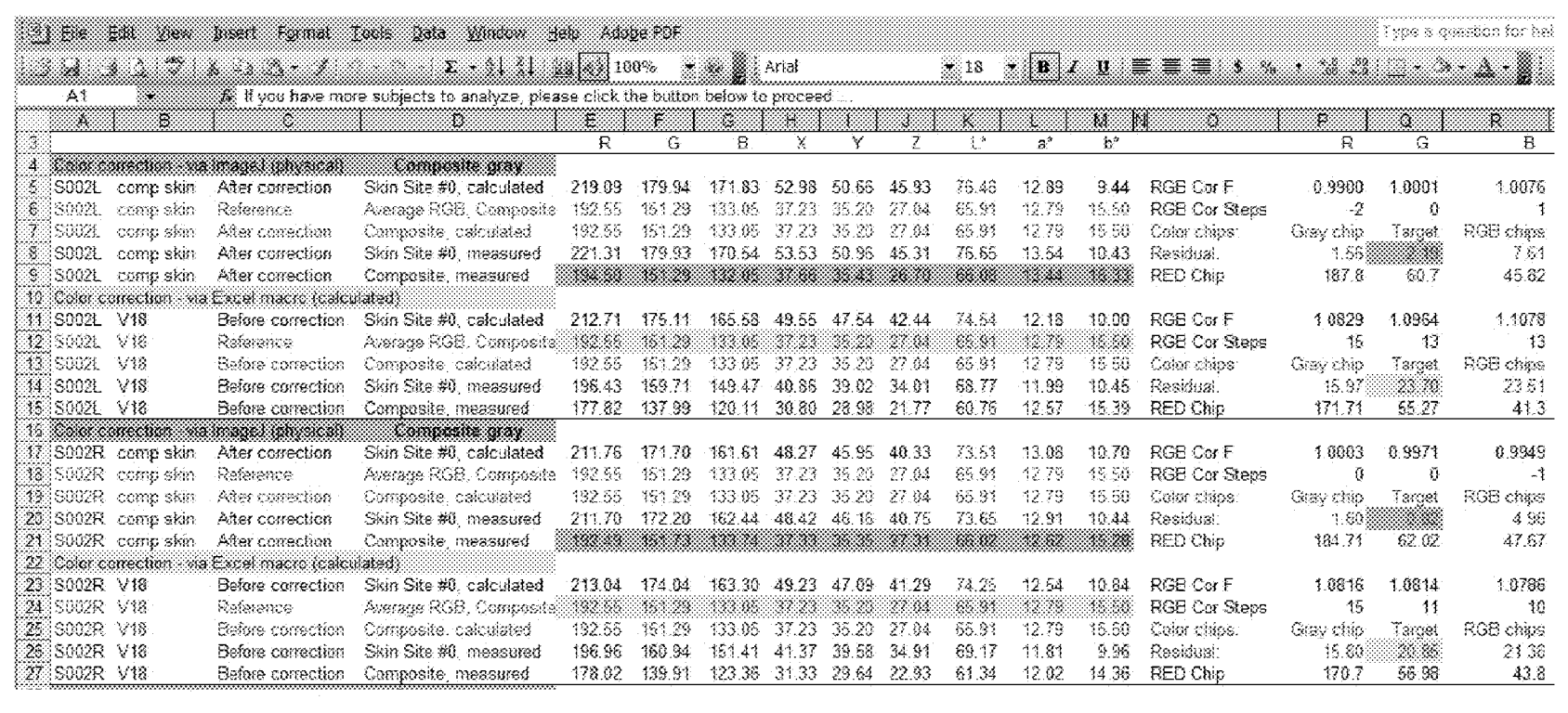

Thereafter, the processor 214 may validate the results of the color correction system. Using the correction factors obtained as described above, the processor 214 may physically correct the color of a picture, which is done by multiplying the picture with the correction factors, as described above. The RGB values of the corrected picture are measured again using the procedure described above and the improvement in color variability is verified by the algorithms. Screenshots of the EXCEL macro and mathematical formulas are illustrated in FIG. 13 and FIG. 14.

The corrected RGB values are incorporated into the EXCEL macro to be converted into XYZ, parameters in a different color space, to be eventually converted into L*a*b* values of the CIELAB color space. These conversions permit comparison of color properties of skin with existing skin color measuring instruments such as a Minolta Chromameter or other color meters. Using the corrected RGB values from the pictures, the skin color before and after product treatment is determined and efficacy of the test product is quantified.

Figure 5:
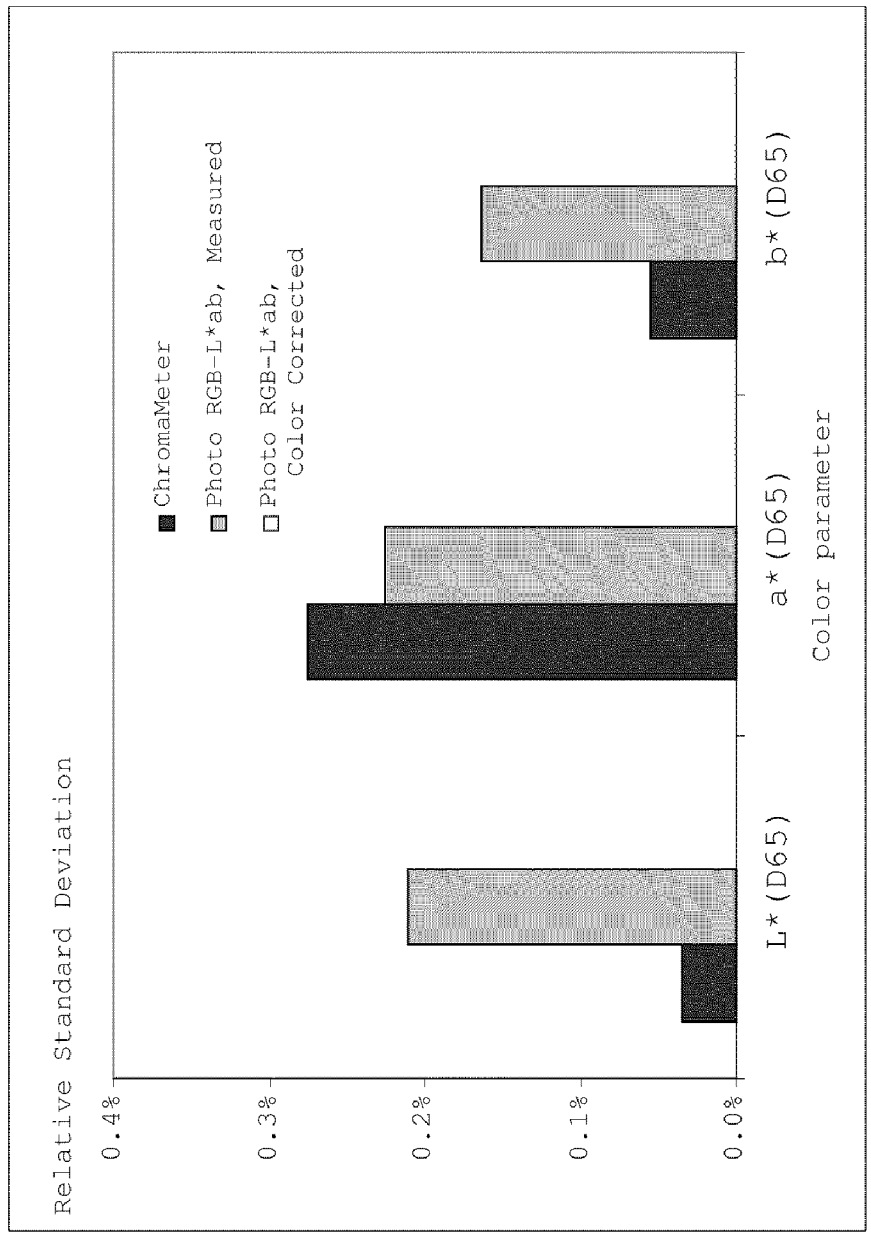
FIG. 5 depicts the measurement variability of test methods on an inert skin tone sponge pad.
Figure 6:
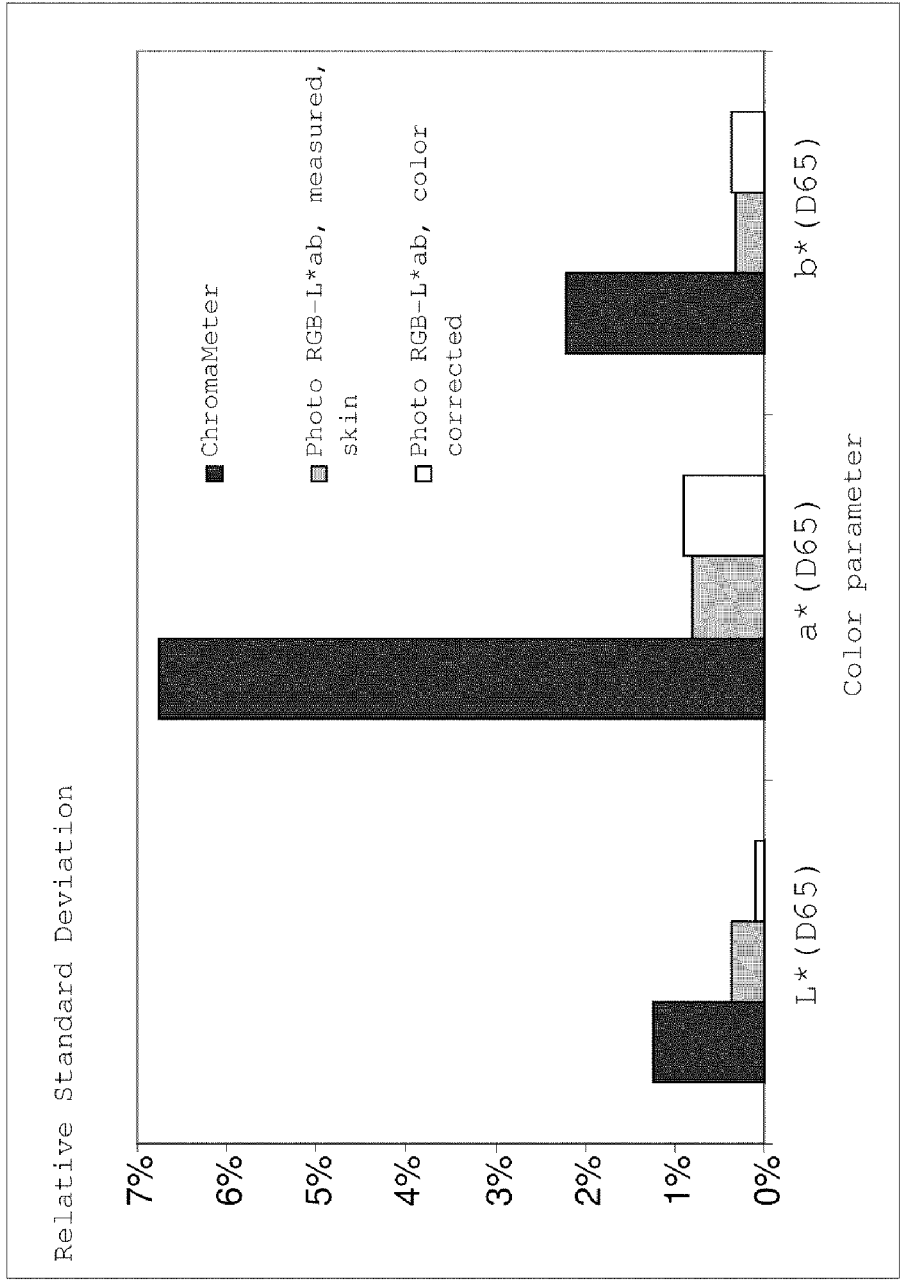
FIG. 6 depicts the measurement variability of test methods on the back of a hand.

FIGS. 5-6 include charts that depict a comparison of the results obtained using the image analysis technique, described herein, versus conventional colorimetric techniques. In FIG. 5, the measurements are conducted on an inert skin tone sponge pad. The results for the colorimetric technique are labeled "ChromaMeter." The results for the image analysis technique is labeled "Photo RGB-L*ab, Measured." Both the colorimetric and image analysis techniques have equivalent and low variability results before color correction. In each case, minimal variability is achieved after color correction.

In FIG. 6, the measurements indicate that significant variability is introduced when the measurements are conducted on the human skin in vivo. The image analysis technique remained at a low level of variability, which is labeled "Photo RGB-L*ab, measured, skin." The level of variability of the image analysis technique becomes even lower after color correction, which is labeled "RGB-L*ab, color corrected." The maximum percentage of error increased from 0.3% to almost 7% for the colorimetric technique, which is labeled "ChromaMeter." The low variability associated with the image analysis technique demonstrates a clear advantage over the colorimetric technique.

In FIG. 7, comparison of the deviation of the L* value for the color chips from the target color standard before and after color correction indicated a dramatically reduced deviation after color correction of the image analysis technique.

Figure 8:
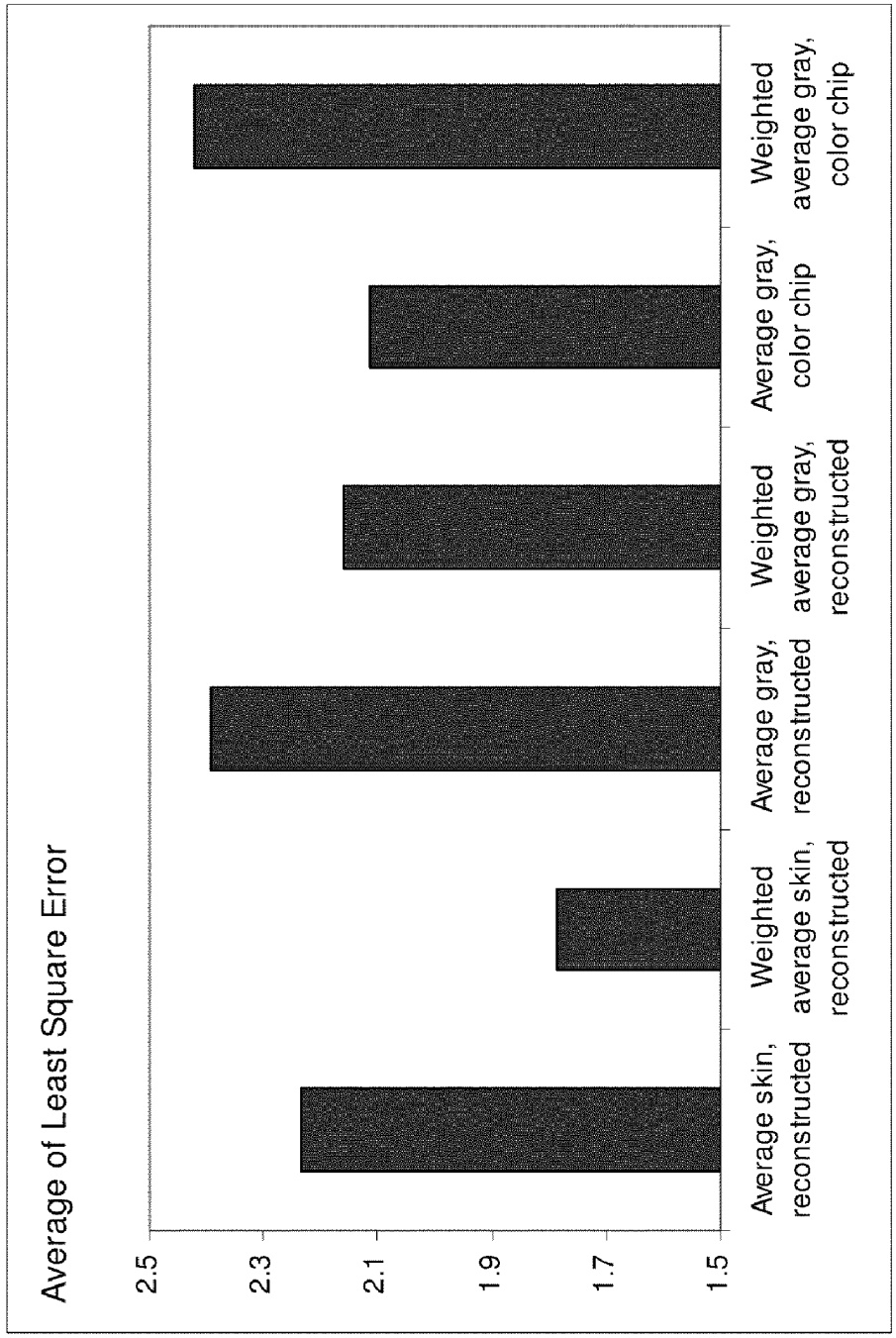
FIG. 8 depicts the effect of target color on the least square error of one skin site measured from 13 pairs of pictures, before and after correction.

In FIG. 8, the result of the average least squares analysis demonstrates the affect of target color on the accuracy of color correction for the same skin site measured based upon 13 pairs of pictures. For example, when a set of weighted average RGB values from a reconstructed skin site is used as target colors, the lowest value of least square error is obtained among the six different candidate conditions tested.

Figure 9:
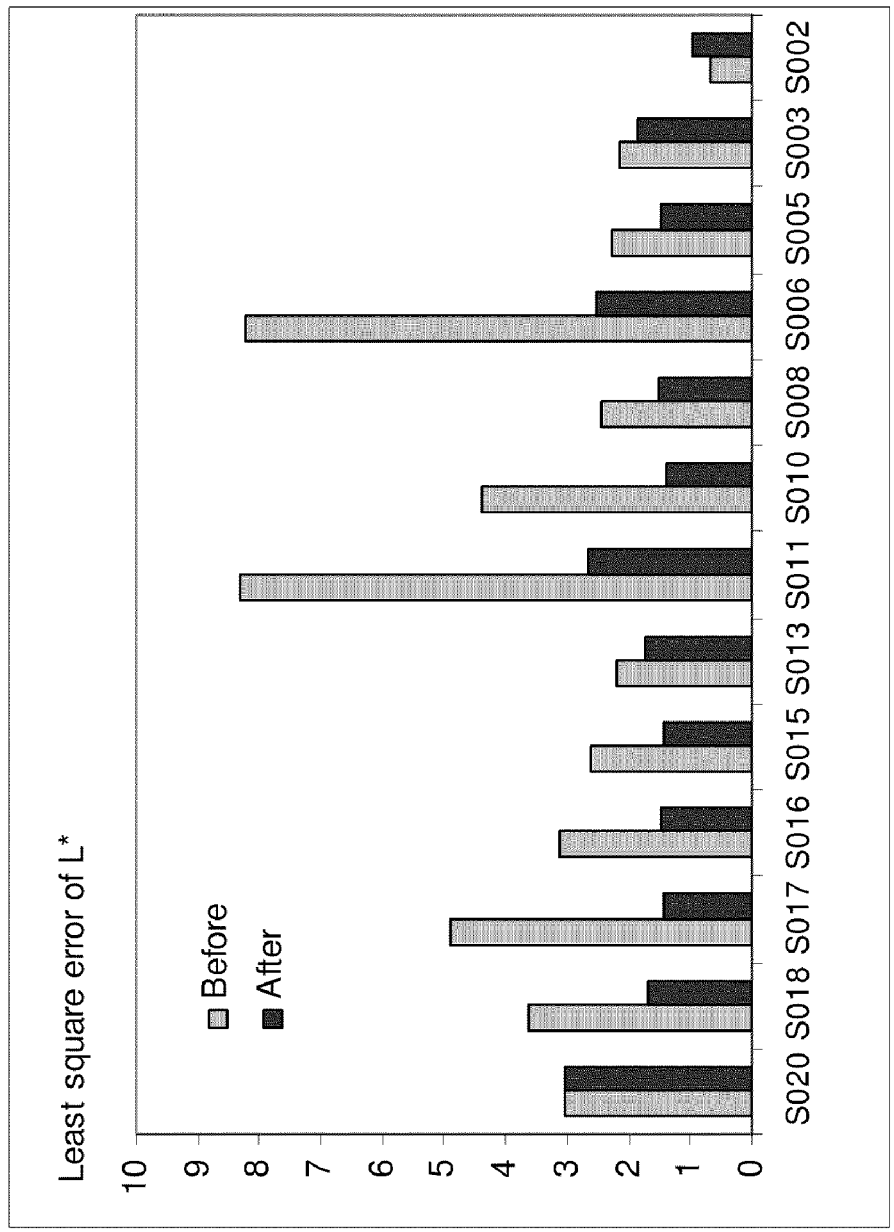
FIG. 9 depicts the agreement of L* values of one skin site measured from two different pictures, before and after correction.

In FIG. 9, the bar graph demonstrates the agreement of L* values of skin sites measured from the 13 pairs of digital color photographs before and after color correction. Theoretically, the L* values between each pair of pictures should be the same since the property of the same skin site appears in two different pictures taken a couple of minutes apart. The difference between the before color correction and after color correction is caused by small variations in picture taking conditions. After color correction, the difference of the L* values for each pair of digital color photographs is significantly reduced.

Figure 10:
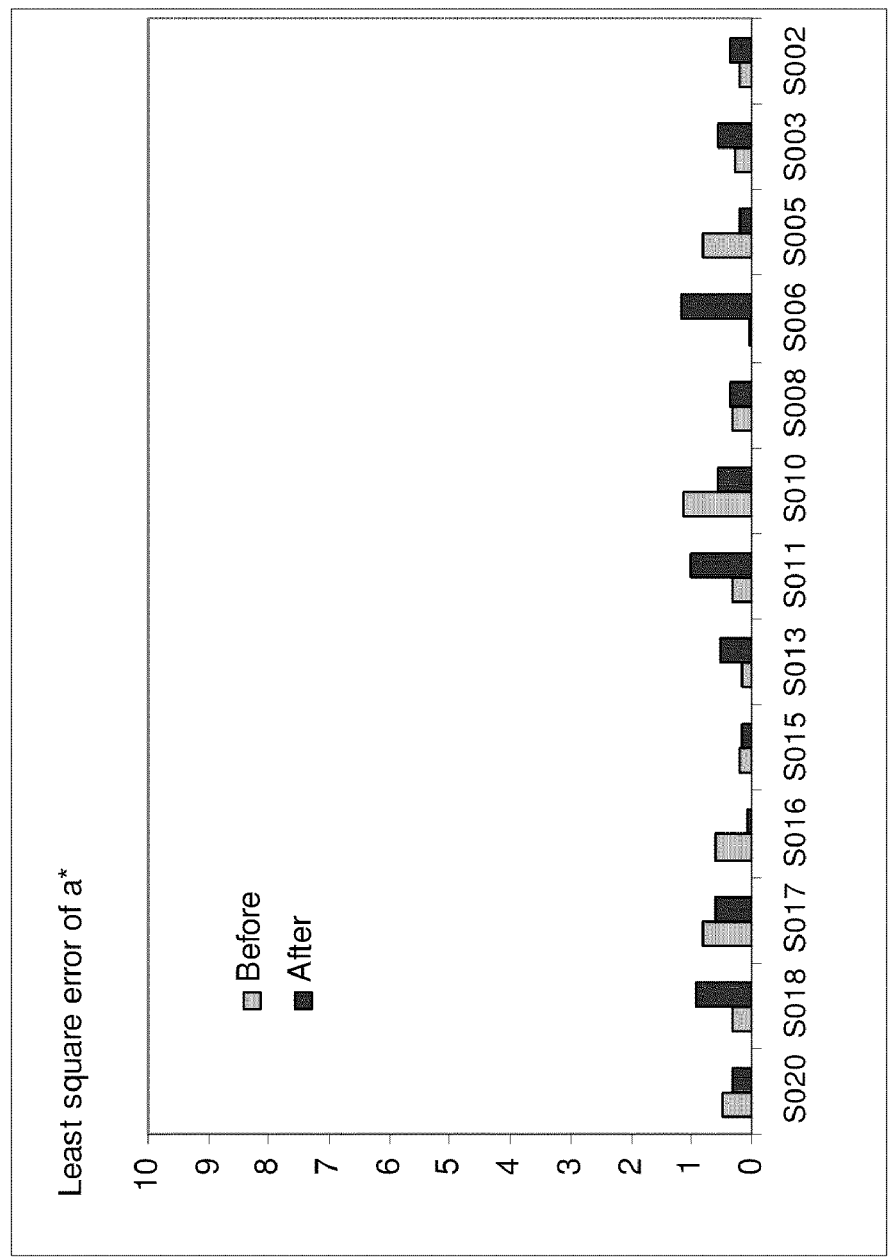
FIG. 10 depicts the agreement of a* values of one skin site measured from two different pictures, before and after correction.
Figure 11:
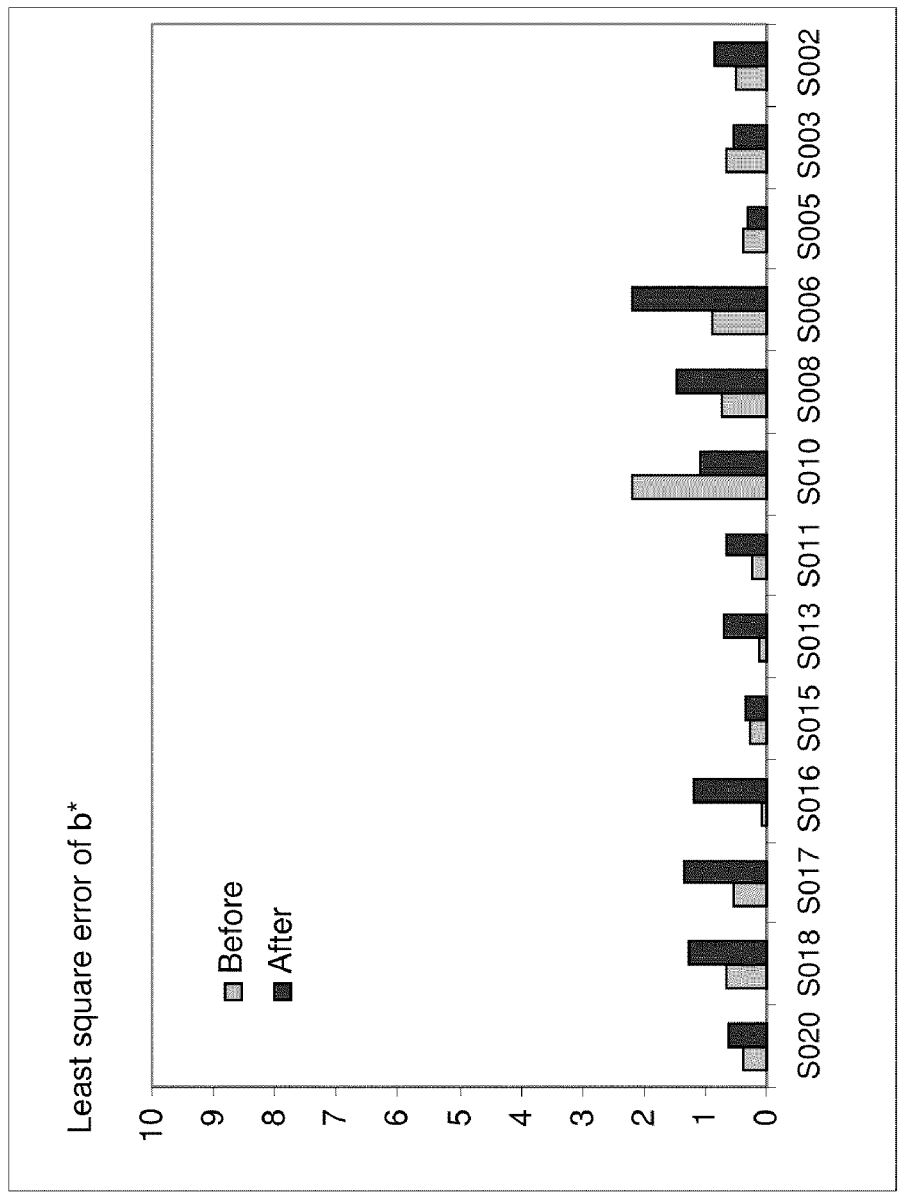
FIG. 11 depicts the agreement of b* values of one skin site measured from two different pictures, before and after correction.

In FIGS. 10 and 11, the bar graphs depict the a* and b* values corresponding to the L* values of the 13 pairs of color photographs used to formulate FIG. 9. The same effect of improved agreement of the L* values are also seen for the a* and b* values, respectively. The improved agreement of a* and b* values demonstrates improved consistency between the digital color photographs.

While various examples of the invention have been described, it will be apparent to those of ordinary skill in the art that many more embodiments and implementations are possible within the scope of the invention. Accordingly, the invention is not to be restricted except in light of the attached claims and their equivalents.

What is claimed:

1. An apparatus for correcting color of a photographic image comprising:
    at least one of a camera and a scanner in communication with a processor, wherein the at least one of the camera or the scanner is configured to capture a plurality of digital color photographs, wherein each of the digital color photographs includes an image of a skin of a test subject at a skin site, wherein the skin site includes a test strip having one or more color chips proximate to the skin of the test subject;
    the processor configured to receive the digital color photographs and to store the digital color photographs;
    the processor further configured to determine a target skin color based on an average of measured skin color values obtained from the image of skin in each of the digital color photographs;
    the processor further configured to determine composite color values for the color chips in the test strip based on an average of measured chip color values taken from each of the digital color photographs;
    the processor further configured to calculate composite factors for an operative digital color photograph of the digital color photographs based on the composite color values and the target skin color; and
    the processor further configured to calculate a reconstructed skin color for the operative digital color photograph based on the composite factors and the measured skin color values for the skin of the test subject included at the skin site of the operative digital color photograph.

2. The apparatus for correcting color of a photographic image of claim 1, further comprising the processor configured to generate correction factors for the operative digital color photograph of the digital color photographs based upon the reconstructed skin color for the operative digital color photograph and the target skin color.

3. The apparatus for correcting color of a photographic image claim 2, further comprising the processor further configured to color correct the operative digital color photograph as a function of the correction factors to generate a color corrected photograph for the operative digital color photograph.

4. The apparatus for correcting color of a photographic image claim 3, wherein the operative digital color photograph includes a plurality of color values and wherein the processor is further configured to color correct the operative digital color photograph as the function of the correction factors comprises and to multiply color values included in the operative digital color photograph by the correction factors for the operative digital color photograph to generate the color corrected photograph.

5. The apparatus for correcting color of a photographic image of claim 4, wherein the processor is in communication with a user interface; and the user interface is configured to display the color corrected photograph.

6. The apparatus for correcting color of a photographic image of claim 1, wherein the reconstructed skin color includes reconstructed skin color values; wherein the target skin color includes target skin color components, where each of the respective target skin color components is associated with one of the reconstructed skin color values;
    wherein the processor configured to calculate the reconstructed skin color for the operative digital color photograph based on the composite factors and the measured skin color values for the skin of the test subject included at the skin site of the operative digital color photograph further comprises:
        the processor is configured to calculate a respective correction factor of the correction factors for one of the reconstructed skin color values based upon a ratio of the one of the reconstructed skin color values and the associated target skin color components.

7. The apparatus for correcting color of a photographic image of claim 2, wherein at least one of the color chips includes a flesh tone color.

8. The apparatus for correcting color of a photographic image of claim 1, wherein the processor is configured to calculate the least squares error between the reconstructed skin color of the operative digital color photograph and the target skin color of the digital color photographs, wherein the reconstructed skin color include corrected skin color values.

9. A tangible non-transitory computer readable storage medium with computer program code embodied thereon, the computer program code executable on a processor, the computer program code comprising:
    an instruction to retrieve a plurality of digital color photographs stored in a memory, wherein each of the digital color photographs includes an image of skin of a test subject at a skin site, wherein the skin site includes a test strip having one or more color chips proximate to the skin of the test subject;
    an instruction to average a measured skin color of the skin included in each skin site of each of the digital color photographs to determine a target skin color;
    an instruction to average measured chip color values for each of the color chips included in each skin site of the digital color photographs to determine an average chip color for each of the color chips; an instruction to calculate, with the processor, composite factors for an operative digital color photograph of the digital color photographs based upon the average chip color of each of the color chips and the target skin color; and
    an instruction to calculate a reconstructed skin color for the skin at the skin site of the operative digital color photograph based upon the composite factors and the measured skin color for the skin at the skin site include in the operative digital color photograph.

10. The tangible computer readable storage medium of claim 9, further comprising an instruction to generate correction factors for the operative digital color photograph of the digital color photographs based upon the reconstructed skin color for the operative digital color photograph and the target skin color.

11. The tangible computer readable storage medium of claim 10, further comprising an instruction to color correcting the operative digital color photograph as a function of the correction factors to generate a color corrected photograph.

12. The tangible computer readable storage medium of claim 11, wherein the operative digital color photograph includes a plurality of color values; and wherein the instruction to color correct the operative digital color photograph as the function of the correction factors further comprises an instruction to multiply the color values included in the operative digital color photograph by the correction factors of the operative digital color photograph to generate the color corrected photograph.

13. The tangible computer readable storage medium of claim 10, wherein the target skin color includes target color components, and the reconstructed skin color include reconstructed color values, and wherein the instruction to generate the correction factors for the operative digital color photograph of the digital color photographs based upon the reconstructed skin color for the operative digital color photograph and the target skin color for the skin in the digital color photographs comprises an instruction to determine a correction factor of the correction factors for a respective reconstructed color component based upon a ratio of the respective reconstructive color component and a corresponding one of the target color components.

14. The tangible computer readable storage medium of claim 10, wherein the reconstructed skin color of the operative digital color photograph includes a first color value, a second color value, and a third color value; wherein the target skin color includes a first target color value, a second target color value, and a third target color value; the computer program code further comprising:
an instruction to divide the first color value by the first target color value to generate a first correction factor of the correction factors for the operative digital color photograph; an instruction to divide the second color value by the second target color value to generate a second correction factor of the correction factors dividing the first color value by the first target color value to generate a first correction factor of the correction factors; and an instruction to divide the third color value by the third target color value to generate a third correction factor of the correction factors.

15. The tangible computer readable storage medium of claim 9, further comprising: an instruction to calculate the least squares error between the reconstructed skin color of the operative digital color photograph and the target skin color of the digital color photographs.

16. The tangible computer readable storage medium of claim 9, wherein the measured skin color for the skin included in the operative digital color photograph is an uncorrected skin color having L*a*b* color values of in a CIELAB color space; wherein the reconstructed skin color includes corrected skin color values; and the computer program code further comprising:
an instruction to convert the corrected skin color values into L*a*b* color values of the CIELAB color space; and
an instruction to quantify a change in skin color of the test subject by calculating a difference between the L*a*b* color values of the uncorrected skin color and the L*a*b color values of the corrected skin color values.

17. The tangible computer readable storage medium of claim 9, wherein the reconstructed skin color includes corrected skin color values; and the computer program code further comprising:
an instruction to convert the measured skin color for the skin of the test subject included in the operative digital color photograph to an uncorrected skin color having L*a*b* color values of in CIELAB color space;
an instruction to convert the corrected skin color values into L*a*b* color values of the CIELAB color space; and
an instruction to quantify a change in skin color of the test subject by calculating a difference between the L*a*b* color values of the uncorrected skin color and the L*a*b color values of the corrected skin color values.

18. A method of color correcting digital photographs comprising:
retrieving, with a processor, a plurality of digital color photographs stored in a memory, wherein each of the digital color photographs includes an image of skin of a test subject at a skin site, and wherein the skin site includes a test strip having one or more color chips proximate to the skin of the test subject;
obtaining, with the processor, a measured skin color of the skin included in each image of skin at the skin site from each of the digital color photographs under consideration;
averaging, with the processor, the measured skin color for the skin included in each image of skin at the skin site to determine a target skin color; obtaining a measured chip color value of at least some of the color chips included in each skin site from the digital color photographs under consideration;
averaging, with the processor, the measured chip color value of the at least some of the color chips included in each skin site to determine an average chip color for each of the at least some color chips;
calculating, with the processor, composite factors for an operative digital color photograph of the digital color photographs based upon the average chip color of the at least some color chips and the target skin color; and
calculating, with the processor, a reconstructed skin color for the skin at the skin site of the operative digital color photograph based upon the composite factors and the measured skin color for the skin at the skin site include in the operative digital color photograph.

19. The method of claim 18, further comprising calculating, with the processor, the least squares error between the reconstructed skin color of the operative digital color photograph and the target skin color of the digital color photographs.

20. The method of claim 18, further comprising generating, with the processor, correction factors for the operative digital color photograph of the digital color photographs based upon the reconstructed skin color for the operative digital color photograph and the target skin color for the skin in the digital color photographs.

21. The method of claim 20, wherein the operative digital color photograph includes a plurality of color values; and wherein color correcting the operative digital color photograph as the function of the correction factors comprises multiplying, with the processor, the color values included in the operative digital color photograph by the correction factors of the operative digital color photograph to generate a color corrected photograph.

22. The method of claim 21, wherein the target skin color includes target color components, and the reconstructed skin color include reconstructed color values; and
wherein generating, with the processor, the correction factors for the operative digital color photograph of the digital color photographs based upon the reconstructed skin color for the operative digital color photograph and the target skin color for the skin in the digital color photographs comprises determining a correction factor of the correction factors for a respective reconstructed corresponding one of the target color components.

23. The method of claim 22, wherein digital color photographs are created by at least one of a scanner and a digital camera.

* * * * *